Nov. 18, 1969     C. G. KEMP     3,478,476
MOLDING INSTALLATION
Filed March 15, 1968
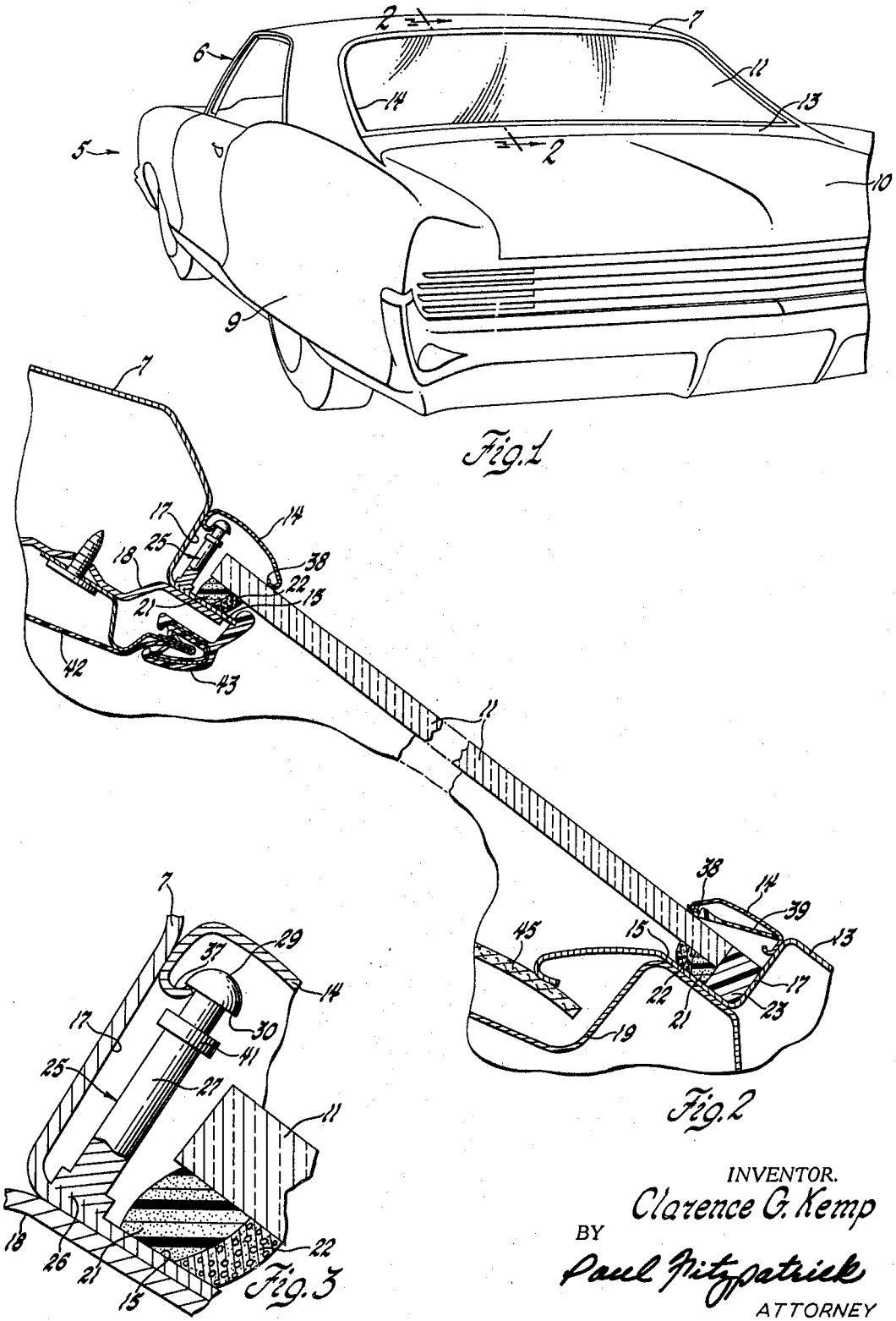
INVENTOR.
Clarence G. Kemp
BY
Paul Fitzpatrick
ATTORNEY United States Patent Office 3,478,476
Patented Nov. 18, 1969

3,478,476
MOLDING INSTALLATION
Clarence G. Kemp, Warren, Mich., assignor to General Motors Corporation, Detroit, Mich., a corporation of Delaware
Filed Mar. 15, 1968, Ser. No. 713,530
Int. Cl. E06b 1/36; B60j 1/18
U.S. Cl. 52—208                                    5 Claims

ABSTRACT OF THE DISCLOSURE

An automobile rear window is mounted in the opening in the rear of the body in a known manner. A reveal molding which surrounds the margin of the window is retained by a number of spring pins fixed to the body and extending from it perpendicular to the window between the margin of the window and the frame. These pins have heads under which a flange of the reveal molding is caught.

---

My invention relates to retention of moldings, and particularly to an arrangement of a fixed window in a vehicle body with improved means for retaining the usual trim which surrounds the edge of the window, called a reveal molding. It will be apparent from the subsequent description of the preferred embodiment of my invention, however, that it is applicable to many other uses.

In general, fixed windows of vehicle bodies such as windshields, rear windows, and side windows in some cases, comprise a glass panel which fits over an opening in the body surrounded by a generally L-section sheet metal frame made up by components of the vehicle body. The window glass is located in the frame so as to be spaced somewhat from the metal parts and may be retained by a circumferential bead of adhesive or caulking compound between the glass and the frame. To preserve an attractive appearance, it is usual to provide a sheet metal trim strip or molding around the margin of the glass which conceals the adhesive and also bridges the gap between the glass and frame.

Various means for retention of such a molding have been proposed. See, for example, Coppock U.S. Patent No. 3,241,277 for Window Mounting, issued Mar. 22, 1966, which discloses a preferred arrangement for mounting the glass panel in the frame and also means, upon which my present invention is considered to be an improvement, for retaining the reveal molding. Also, the installation described in U.S. patent application of Adams for Reveal Molding Installation and Clip, Patent No. 3,413,770, issued Dec. 3, 1968, of common ownership with this application. In the structure of the Adams patent, the reveal molding is retained by clips which are mounted on studs extending from the windshield frame.

By employment of my invention, such clips are dispensed with, and the molding is retained directly by resilient pins or studs fixed to the windshield or other window frame. To summarize the general nature of my invention, the margin of the window glass is surrounded by spaced resilient studs which extend from the frame generally perpendicular to the glass. These studs have heads under which the outer edge of the reveal molding is caught with the inner edge of the molding bearing against the glass.

The principal objects of my invention are to improve the durability of automobile bodies, and to simplify the assembly thereof and to provide an arrangement for retention of a molding involving snapping the molding between a wall or surface and a resilient stud extending alongside the wall.

The nature of my invention and the advantages thereof will be clear to those skilled in the art from the succeeding detailed description of the preferred embodiment of the invention and the accompanying drawings thereof.

FIGURE 1 is a perspective view of the rear quarter of an automobile body illustrating the rear window installation.

FIGURE 2 is a vertical sectional view taken on the plane indicated by the line 2—2 in FIGURE 1.

FIGURE 3 is an enlarged view of a portion of FIGURE 2.

Referring to the drawings, FIGURE 1 is a pictorial view of a known passenger vehicle of a two-door coupe type. The vehicle 5 has a body 6 which includes a roof panel 7, rear quarter panels 9, a rear deck lid 10, a rear window 11, and a tulip panel 13 between the rear window and deck lid. A reveal molding 14 extends around the margins of the rear window. The window 11 is disposed in a frame or opening defined by elements of the body sheet metal. These include the flanged rear edge of the roof panel 7 which provides a first surface 15 underlying and generally parallel to the window and a second surface 17 spaced from and generally perpendicular to the window. The margin of the roof panel is spot-welded to a rear window header 18, the overlapping portions of the two being referred to as the pinchweld flange.

Similarly, the tulip panel 13 overlies a body frame member 19 and is fixed to it at a pinchweld which defines another portion of the first surface 15 around and underlying the window. An offset in the panel defines the second surface 17 at the lower edge of the window. Similar structure (not illustrated) provides a continuation of the first and second surfaces around the right and left sides of the window panel or glass. The window glass 11 is sealed and cemented in place by a ring 21 of adhesive or sealant which extends between the margin of the glass and the first surface. A caulking dam 22 contains the edge of the sealant. The window is properly located in the generally vertical direction in the frame and held against slumping downward before the cement cures by a spacer block 23 at each side of the window frame. This mode of mounting a window glass is more fully described in Patent No. 3,241,277, which shows specifically a windshield installation.

The reveal molding 14 is retained by a considerable number of resilient metal studs 25 extending from the parts defined as first surface 15 and distributed around the perimeter of the window glass. In a full-sized vehicle such as that illustrated there might be, for example, twenty such studs with three at each side of the window frame, seven at the top, and seven at the bottom. The number, of course, is a matter of design. These studs extend generally perpendicular to the glass and preferably are welded to the body sheet metal by the stored energy arc stud welding method, the weld being indicated at 26 in FIGURE 3. Each stud 25 includes a resilient stem 27 terminating in a head 29. The upper surface of the head is preferably domed so the reveal molding can slide past it readily and the undersurface is preferably flat to define an abutment 30 on the undersurface of the head. The stud is made of resilient metal and the length of the stem and its diameter are so chosen that the stud is capable of flexing sidewise without deformation and without requiring too great force when the reveal molding is pushed into place. The particular dimensions are a matter of design. A certain (preferably minor) amount of the yielding may be due to deflection of the body sheet metal. The studs are preferably of stainless steel such as No. 305 to resist corrosion and because this alloy is sufficiently strong, springy, and malleable.

The reveal molding 14 includes a recurved outer flange 37 which is adapted to snap under the abutment 30 and to be impinged between the stem 27 and the surface 17.

The molding preferably also includes a recurved inner flange 38 which bears against the glass panel. In some installations, a number of antisqueak spacers 39 are disposed within the reveal molding so as to lie between its flange 38 and the glass panel. These may be considered to be a part of the reveal molding for our purposes.

It is considered desirable to provide a flange 41 on each stud 25 slightly spaced from the head 29, the object being to prevent the reveal molding from being forced too far into the gap between the window frame and the stud, which could deform the reveal molding surface by contact of the head 29 with the inner surface of the molding.

As will be apparent, the fabrication of a body incorporating our invention is considerably simplified over the prior arrangements referred to above. As a part of the welding together of the body, the studs 25 are welded into place against the pinchweld flanges. After the window is fitted, the reveal molding is simply put in place over the window and within the frame and pressed or driven with a mallet into the frame so that the outer flange snaps over the heads of studs 25.

It is, of course, not essential that the studs be welded; they could be otherwise fixed to the body. For example, they might terminate in sheet metal screws which can be threaded into the body. Such structure might be particularly desirable for repair of damaged bodies where a stud has been broken off.

In addition to the structure previously described, FIGURE 2 shows a headlining 42 suitably secured to the edges of the roof, an internal molding 43 at the upper edge of the window concealing the edge of the window and the edge of the headlining, and a rear compartment front and shelf 45 underlying the forward edge of the tulip panel 13.

The advantages of my invention in facilitating the assembly of vehicle bodies should be clear to those skilled in the art from the foregoing description of the preferred embodiment of the invention. This description is not to be considered as limiting or restricting the invention, since many modifications may be made by the exercise of skill in the art.

I claim:

1. An installation of a panel in an opening in a body comprising, in combination, a body including elements of generally L-shaped cross section framing the opening and defining a first surface underlying the margin of the panel approximately parallel to the panel and a second surface spaced from the margin of the panel approximately perpendicular to the panel; a panel disposed within the opening; a plural number of studs distributed around the periphery of the panel extending approximately perpendicular to the panel from the first surface between the panel and the second surface and standing clear of the second surface and the panel, the studs each including a resilient stem rigidly fixed at one end to the first surface and a head rigid on the other end of the stem; and a molding extending around the panel bridging the gap between the panel and the second surface and bearing against the face of the panel remote from the first surface; the molding including a marginal portion engaging beneath the heads of the studs so as to press the molding against the panel and impinged between the second surface and the studs so as to flex the resilient stems elastically and thus bias the molding against the second surface.

2. An installation as recited in claim 1 in which the body is a motor vehicle body and the panel is a window of the body.

3. An installation as recited in claim 1 in which the studs are welded to the body.

4. An installation as recited in claim 1 in which at least some of the studs bear a flange spaced from the head adapted to engage the undersurface of the molding.

5. An installation as recited in claim 1 in which the panel is a transparent window and the molding is a reveal molding.

References Cited

UNITED STATES PATENTS

| | | | |
|---|---|---|---|
| 2,497,276 | 2/1950 | Scott et al. | 52—208 |
| 2,945,081 | 7/1960 | Bogese et al. | 52—718 X |
| 3,241,277 | 3/1966 | Coppock | 52—208 |
| 3,304,686 | 2/1967 | Munse | 52—718 |
| 3,340,379 | 9/1967 | Sweeney | 52—718 X |

FOREIGN PATENTS 952,029    3/1964    Great Britain.

ALFRED C. PERHAM, Primary Examiner

U.S. Cl. X.R.

52—502, 718, 397; 296—93